May 12, 1953 G. GUANELLA 2,638,586
DISTANCE AND SPEED INDICATING SYSTEM
Filed Sept. 22, 1948 2 Sheets-Sheet 1
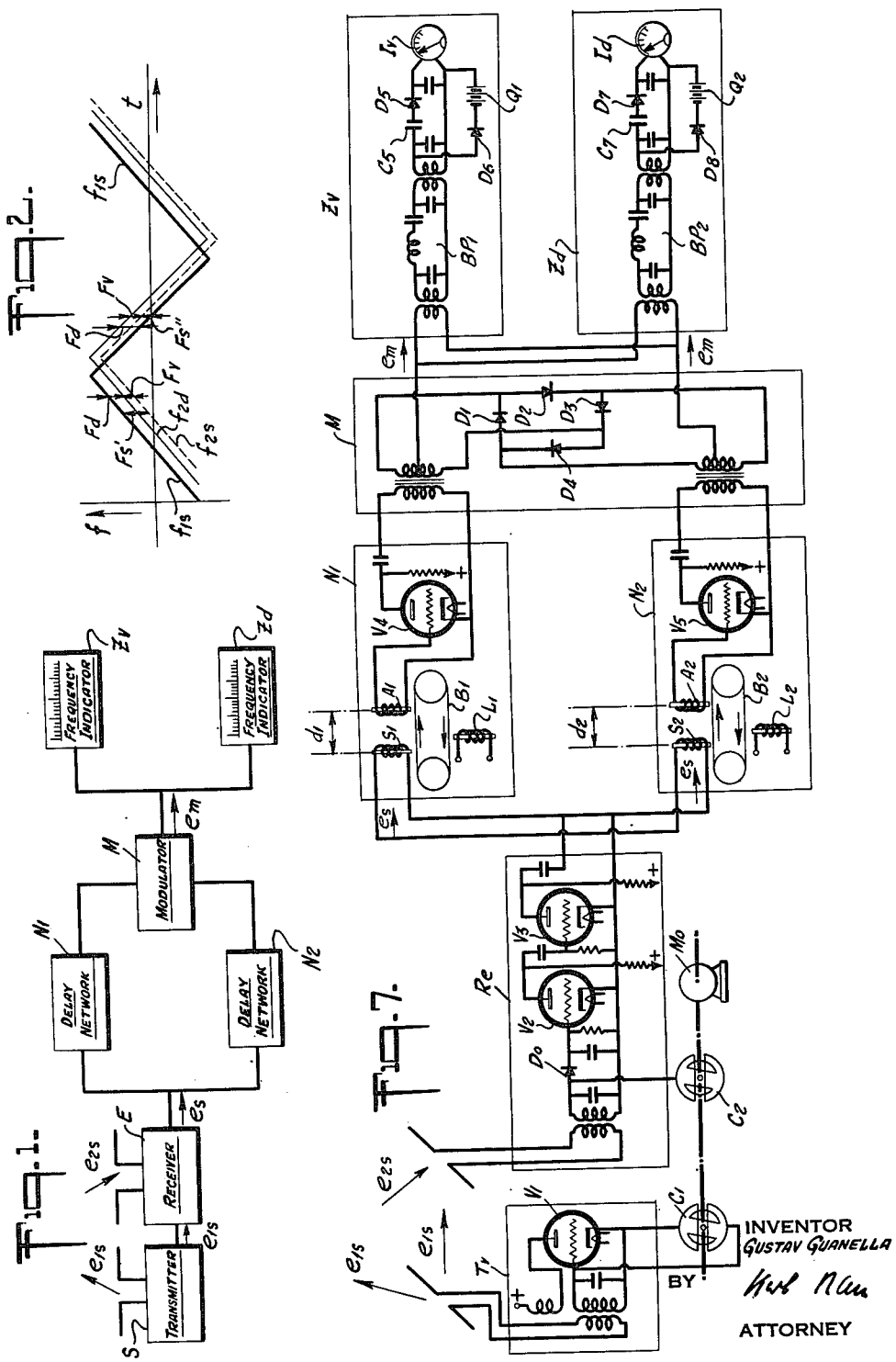
INVENTOR
GUSTAV GUANELLA
BY
ATTORNEY May 12, 1953  G. GUANELLA  2,638,586
DISTANCE AND SPEED INDICATING SYSTEM
Filed Sept. 22, 1948  2 Sheets-Sheet 2

INVENTOR
GUSTAV GUANELLA
BY
ATTORNEY

Patented May 12, 1953

2,638,586

UNITED STATES PATENT OFFICE 2,638,586

DISTANCE AND SPEED INDICATING SYSTEM

Gustav Guanella, Zurich, Switzerland, assignor to Radio Patents Corporation, New York, N. Y., a corporation of New York Application September 22, 1948, Serial No. 50,520
In Switzerland October 27, 1943

Section 1, Public Law 690, August 8, 1946
Patent expires October 27, 1963

7 Claims. (Cl. 343—9)

This application is a continuation-in-part of application Serial No. 578,013, filed February 15, 1945, entitled "Distance and Speed Indicating System," now Patent 2,451,822, dated October 19, 1948.

The present invention relates to a system for indicating the distance and/or speed of moving objects such as aircraft or the like by means of radiant energy, in particular high frequency radio waves. More particularly, the invention is concerned with an improved method of and arrangement for determining the distance of a moving object independently of its speed in a direction towards and away from the observer.

Methods of determining distance by means of acoustic or electromagnetic oscillations according to the echo or reflection principle are well known, wherein the transmitted frequency is varied periodically and a beat is produced between a portion of the radiated oscillation energy and the oscillation reflected from the object whose distance is to be determined, said beat having a frequency proportional to the distance.

A disadvantage of these methods is due to the fact that a relative movement of the body, in the direction to or from the observer, will cause an increase or decrease of the beat frequency due to the so-called Doppler effect. As a result there will be an error in the distance determined from the beat frequency which may be substantial in case of fast moving objects, such as air craft. A further disadvantage of known systems is due to the fact that the speed of the reflecting object which it is desirable to know in many cases cannot be determined directly from a measurement of this type.

In order to overcome the above drawback and other defects inherent in the known systems, the present invention has for its object the provision of means for and a method of separately or simultaneously determining distance and velocity of a moving object by means of radiant wave energy, according to which the electrical oscillations of a transmitter having its frequency modulated in a predetermined manner are applied to at least one receiver, said oscillations being transmitted in part directly from the transmitter and in part by way of the reflecting object, whose distance and/or speed it is desired to determine.

With the above and further objects in view, as will appear hereafter, the invention is characterized by a specific modulation of the frequency of the transmitted oscillation energy in such a manner as to produce a composite beat frequency by superimposing the reflected and the directly transmitted oscillations, the desired distance and speed being derived from the respective components of the beat frequency energy which are dependent upon or proportional to the distance and speed of the object, respectively.

Among the advantages of the invention is the fact that distance and relative speed may be indicated continuously and that the operation of the apparatus for carrying the invention into effect is extremely simple.

The invention, both as to its further objects and novel aspects, will become more apparent from the following detailed description of a few practical embodiments, with reference to the accompanying drawings forming part of this specification, and wherein:

Figure 1 is a block diagram of a basic distance and speed indicating system constructed in accordance with the principles of the invention;

Figure 2 is a graph showing the special wave shape for varying the transmitting frequency employed by the invention;

Figure 7 is a more detailed circuit diagram of a distance and speed indicating system according to the invention as shown in Figure 1.

Like reference characters identify like parts throughout the different views of the drawings.

Figure 3:
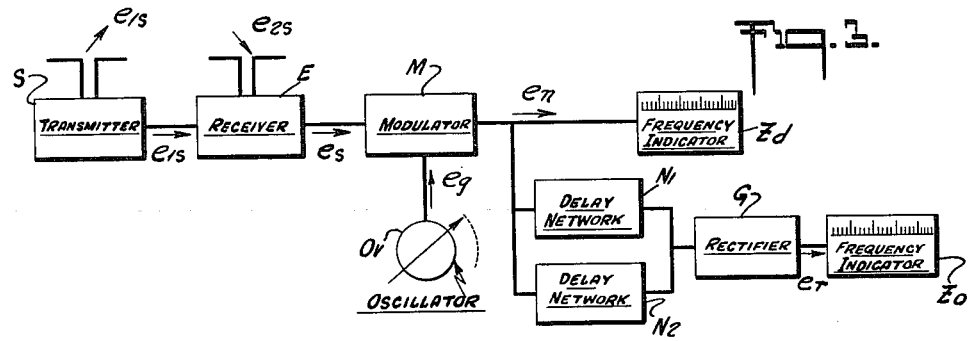
Figure 3 is a block diagram illustrating a modified system for carrying out the invention.

Referring to Figure 1, there is shown a transmitter S adapted to radiate a high frequency signal $e_{1s}$ preferably in the form of a narrow or concentrated beam, said signal having a frequency $f_{1s}$ which is varied continuously and periodically according to a triangular wave by alternately increasing and decreasing the transmitting frequency at substantially equal rates between upper and lower limits in the manner shown by the curve $f_{1s}$ in Figure 2. The transmitted signal, after reflection by a remote object whose distance and/or speed is to be determined, is intercepted by a suitable receiver E mounted close to or combined with the transmitter S, said receiver including the usual means for amplifying and rectifying the received signal energy. There is furthermore applied to the receiver E a portion of the signal $e_{1s}$ directly from the transmitter S and combined with or superimposed upon the signal $e_{2s}$ received by way of reflection from the distant object. As a result, a difference frequency or beat signal $e_s$ will be produced in the output of the receiver E the frequency of which varies in direct proportion to the distance of the reflecting object, in a manner well known in connection with frequency modulated type distance determination systems of this general character.

Referring more specifically to Figure 2, the triangular curve $f_{1s}$, as pointed out, represents the variation of the transmitted frequency as a function of time $t$, curve $f_{2d}$ represents the frequency of the received signal $e_{2s}$ after travelling to and from the distant object, curve $f_{2d}$ being displaced in frequency relative to curve $f_{1s}$ by a frequency difference $F_d$ which is proportional to the distance of the object in a manner well understood, assuming the object to be stationary or at rest relative to the transmitter S. As a result, the receiver output or beat frequency signal $e_s$ will have a frequency which varies in proportion to the distance of the remote object to be determined, which beat frequency may be measured or translated in any suitable manner for effecting an indication or direct reading distance determination.

Assuming now that the object is moving at a speed $v$ in a direction towards or away from the transmitter S, an additional change of the frequency of the reflected and received signal $e_{2s}$ will occur due to the well known Doppler effect, said additional frequency change or Doppler frequency being directly proportional to the speed $v$ and resulting in a decrease or increase of the signal frequency, depending upon whether the object recedes from or approaches the transmitter, respectively. As a result, curve $f_{2s}$ representing the actual frequency at the receiver input will be further displaced relative to curve $f_{1s}$ by an amount $F_v$ equal to the Doppler frequency and being proportional to the relative speed $v$ between the object and the transmitter. The resultant total frequency changes $F'_s$ and $F''_s$ for both increasing and decreasing transmitting frequency, and as shown in Figure 2 will therefore be equal to the sum or difference, respectively, of the difference or beat frequencies $F_d$ and $F_v$ in the case of an object which moves in a direction away from the transmitter at a speed $v$. If the object moves in a direction towards the transmitter, the values of $F'_s$ and $F''_s$ will be interchanged for increasing and decreasing transmitting frequency, as is readily understood.

In accordance with the foregoing, the frequency $F_s$ of the rectified beat voltage $e_s$ at the output of the receiver E varies between the following values: $F'_s = (F_d + F_v)$ and $F''_s = (F_d - F_v)$ as shown and readily understood from the diagram of Figure 2.

By means of suitable networks or retardation devices $N_1$ and $N_2$, Figure 1, the alternately and successively occurring beat frequency signals of frequency $F'_s$ and $F''_s$ are retarded by unequal amounts in such a manner that they will occur simultaneously or substantially coincide with each other at the outputs of the networks. In other words, the relative retardation or time displacement of the output signals by the delay devices $N_1$ and $N_2$ should be one-half of the modulating or frequency variation periods of the transmitted signals, in order to effect a coincidence of the sum and difference frequency signals $F'_s$ and $F''_s$. By then forming the modulation product of the relatively retarded voltages in a modulator M, a resultant voltage $e_m$ is obtained including the following sum and difference frequencies:

$$F'_s + F''_s = 2F_d$$
$$F'_s - F''_s = 2F_v$$

Accordingly, the sum frequency $F'_s + F''_s$ is proportional to the distance $d$ and the difference frequency $F'_s - F''_s$ is proportional to the speed $v$. These sum and difference frequencies are determined or measured separately by means of frequency meters or indicators $Z_d$ and $Z_v$ respectively. By suitably calibrating these indicators, a direct indication of the speed and/or actual distance is enabled in a most simple and efficient manner.

Figure 4:
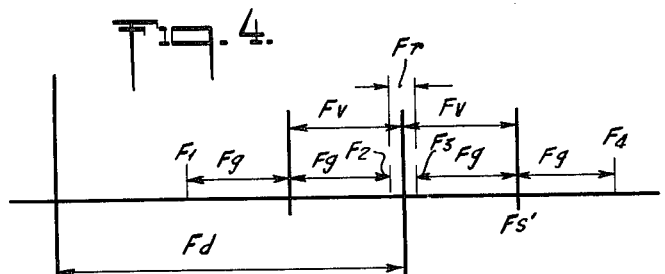
Figure 4 shows a frequency indicating scale explanatory of the function and operation of Figure 3.

A modified arrangement according to the invention is shown in Figures 3 and 4. The rectified receiver output signal $e_s$ again includes the alternately and successively occurring frequencies components $F'_s$ and $F''_s$ in the manner described hereinabove. There is provided according to this embodiment a variable frequency oscillator $O_v$ producing an auxiliary oscillation $e_g$. In the modulator M, the oscillations $e_s$ and $e_g$ are combined to produce a modulation product $e_n$ which, as shown in Figure 4, comprises the sum and difference frequencies $F_4$ and $F_3$ equal to $F'_s + F_g$ and $F'_s - F_g$, on the one hand, and $F_2$ and $F_1$ equal to $F''_s + F_g$ and $F''_s - F_g$, on the other hand. By means of the networks $N_1$ and $N_2$, the signals are again retarded by unequal time delays in such a manner that the sum frequency $F_2$ and the difference frequency $F_3$ occur simultaneously or coincide or with each other in time. After combination of the frequencies $F_2$ and $F_3$ and rectification in the rectifier G, a new difference frequency signal $e_r$ is produced having a frequency $F_r$ which is indicated by a suitable instrument $Z_0$. In operation, the frequency of $e_r$ is reduced to zero by means of a corresponding adjustment of the frequency of oscillator $O_v$. Accordingly, frequencies $F_2$ and $F_3$ will be equal or coincide with each other. In the latter case, the auxiliary frequency $F_g$ of oscillator $O_v$ will be proportional to the frequency $F_v$ or in turn to the speed $v$, since $(F'_s - F''_s) = 2F_v$ according to the foregoing. Thus, if the oscillator $O_v$ is suitably calibrated, the speed may be determined directly from the oscillator adjustment. Furthermore, the frequencies $F_2$ and $F_3$ which in this case are equal and coincide with $F_d$, may be indicated by the frequency indicator $Z_d$ which thus enables a direct indication of the distance $d$.

Figure 5:
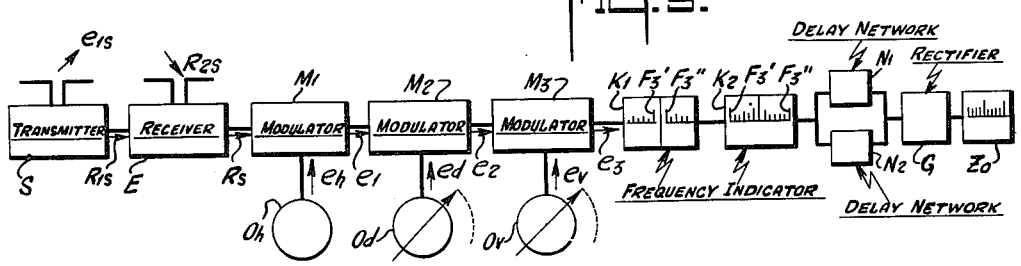
Figures 5 and 6 are block diagrams showing still further modifications of the invention.

Figure 5 shows a further modification of a system for carrying into effect the invention. The beat frequency voltage $e_s$ obtained from the receiver E is intermodulated in a first modulator $M_1$ with the auxiliary modulating signal $e_h$ of constant frequency $F_h$ and produced by an oscillator $O_h$, whereby to result in a voltage $e_1$ comprising the sum frequency $F_s + F_h$. By means of a further modulation in a second modulator $M_2$ with the auxiliary modulating signal $e_d$ having an adjustable frequency $F'_d$ and produced by an oscillator $O_d$, there is obtained a further difference frequency signal, $e_2$ having a frequency $F_s + F_h - F'_d$. The total displacement $F_h - F'_d$ of the beat frequency $F_s$ can accordingly be controlled by adjusting the oscillator $O_d$. By means of a further modulator $M_3$, the modulation product $e_3$ of signal $e_2$ and a further adjustable auxiliary frequency $F'_v$ produced by an oscillator $O_v$ is obtained, the signal $e_3$ comprising the following sum and difference frequency components:

$$F_3 = F_s + F_h - F'_d \pm E'_v$$
$$= F_d \pm F_v + F_h - F'_d \pm E'_v$$

With increasing transmitting frequency and increasing distance this signal contains the following components:

$$F'_3 = F_h + (F_d - F'_d) + (F_v - F'_v)$$

With decreasing transmitting frequency, however, $F_3$ contains the following components:

$$F''_3 = F_h + (F_d - F'_d) - (F_v - F'_v)$$

These two components are rendered visible in the frequency spectrograph $K_1$ in the form of corresponding scale deflections. Generator $O_v$ is then adjusted in such a manner that both deflections coincide, that is, that $F'_3 = F''_3$. In this case, $(F_v - F'_v) = 0$, that is the auxiliary frequency $F'_v$ adjusted by means of $O_v$ coincides with the beat frequency portion $F_v$ which is proportional to the speed of the object. The speed may accordingly be read directly from the setting of the oscillator $O_v$ by suitably calibrating the latter. After this adjustment, the indication of the coinciding frequencies $F'_3$ and $F''_3$ in the frequency spectrograph is brought into the middle of the scale by adjusting the auxiliary frequency $F'_d$ of the oscillator $O_d$. This setting corresponds to the frequency $F_h$ of the oscillator $O_h$. Accordingly, $F_d - F'_d = 0$, that is the auxiliary frequency $F'_d$ coincides with the portion $F_d$ of the beat frequency which is proportional to the distance $d$. By suitably calibrating the oscillator $O_d$, it is thus possible to obtain a direct indication of the actual distance of the object free from any error due to the Doppler effect.

In order to enable a more accurate adjustment and measurement, a second frequency indicator $K_2$ may be provided following the first indicator $K_1$, by means of which small deviations from frequency $F_h$ may be clearly determined. This frequency indicator may be a frequency spectrograph provided with smaller spacings between the frequency calibrations or it may be a frequency discriminator capable of indicating deviations from the prescribed frequency both as regards magnitude and sign. Such frequency discriminators, which may comprise a pair of coupled oscillation circuits and means for effecting a phase comparison between the input and output voltages of said circuits or which may comprise two mutually detuned oscillation circuits and means for effecting an amplitude comparison of both output voltages of said circuits, have the advantage that disturbing voltages such as amplifier noise do not cause a permanent deflection, since the disturbing frequencies lie both above and below the prescribed frequency and on the average their effects will cancel each other. Small differences between the alternately occurring frequencies $F'_3$ and $F''_3$ can furthermore be determined by rectification of the signals in G and indicating the resulting beat by a frequency indicator $Z_o$. For this purpose, networks $N_1$, $N_2$ are provided having unequal transit times so as to cause the alternately occurring frequencies to coincide in time.

In practice, the average frequency of $K_1$ and $K_2$, respectively, may differ from the auxiliary frequency $F_h$ of oscillator $O_h$. In this case, the auxiliary frequency $F'_d$ after adjustment to the middle of the scale also deviates by a corresponding amount from the frequency $F_d$ proportional to the distance, which fact can readily be taken into account by suitably calibrating the oscillator $O_d$.

Figure 6:
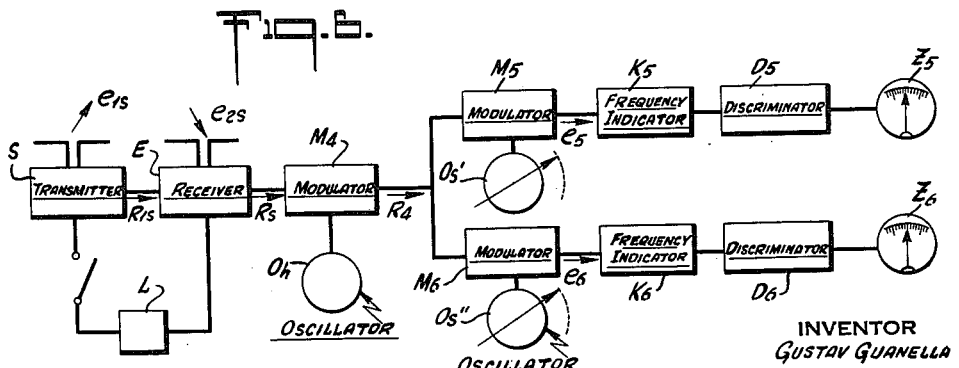

A somewhat modified arrangement similar to Figure 5 is shown in Figure 6. In the latter, the output of modulator $M_4$ supplies a signal $e_4$ having a frequency $F_4 = F_s + F_h$. In the modulators $M_5$ and $M_6$, the difference frequencies are formed between the signal $e_4$ and the auxiliary frequencies $F'_s$ and $F''_s$ produced by the oscillators $O'_s$ and $O''_s$, respectively. The resulting frequencies $F_5$ and $F_6$ of the output signals $e_5$ and $e_6$ of the modulators then contain the following components:

$$F'_5 = F_h + F_d + (F_v - F'_s)$$

and $$F''_6 = F_h + F_d + (-F_v - F''_s)$$

Both these components are caused to coincide by adjusting the oscillators $O'_s$ and $O''_s$. Accordingly:

$$F_v - F'_s = -F_v - F''_s$$

wherefrom:

$$F_v = \tfrac{1}{2}(F'_s - F''_s)$$

The deflections of $K_5$ and $K_6$ are then brought to the mid-point of the scale corresponding to a frequency $F'_h$, by means of a further simultaneous adjustment of $O'_s$, $O''_s$. Accordingly:

$$F'_5 = F_h + F_d + F_v - F'_s = F_k$$
$$F''_6 = F_h + F_d - F_v - F''_s = F_k$$

From this the sum and difference of $F'_5$ and $F''_6$ is obtained as follows:

$$F_d = (F_k - F_h) + \tfrac{1}{2}(F'_s + F''_s)$$
$$F_v = \tfrac{1}{2}(F'_s - F''_s)$$

By a suitable calibration, it is possible, therefore, to obtain a direct indication of the distance $d$ from the sum of the settings of the oscillators $O'_s$ and $O''_s$ and to obtain an indication of the relative speed $v$ from the difference of said settings. To facilitate the reading, two scales may be provided which are connected with the adjusting elements of the oscillators by means of differential gear arrangement adapted to form the sum and difference values indicated by suitable scales which thus enable a direct indication of the sum and difference of both settings and accordingly of the distance and speed, respectively, to be determined. For $F_k = F_h$, the expression $F_d$ is simplified accordingly as follows:

$$F_d = \tfrac{1}{2}(F'_s + F''_s)$$

To enable the required average frequency $F_k$ to be more accurately indicated, discriminators $D_5$, $D_6$ may be provided with meters $Z_5$ and $Z_6$ which serve to indicate small deviations in magnitude and sign from the required frequency $F_k$.

With the arrangements described, it is possible to automatically adjust the auxiliary oscillators to correspond to a variable distance and velocity. The discriminator output voltage $D_5$ may for instance serve for the automatic adjustment of the oscillator $O'_s$, so that this oscillator may be continuously controlled to maintain the frequency $F_k$ constant. It is also possible in a similar manner to automatically readjust oscillator $O''_s$ in dependence on the output voltage of $D_6$.

Auxiliary oscillators $O_h$ in Figures 5 and 6 may also be constructed so as to be capable of being adjusted in steps for changing the distance range covered by the system.

The distance determined by measuring the beat frequency depends on the wobbling frequency and the range within which the frequency of transmitter S is varied. As a result of changes in the wobbling speed or frequency range, measuring errors may occur. It is therefore advisable to test the adjustment of the system by connecting a calibrating line L having a known transit time between the transmitter S and the receiver E as shown in Figure 6. The wobbling frequency of the transmitter is then so adjusted that the distance indication corresponds with the transit time of line L.

The frequency of the electrical oscillations employed is generally higher than 100 mc., the most favorable frequency to be selected in each case depending on the size and shape of the reflecting object.

Referring to Figure 7, there is shown a more detailed circuit diagram of a distance indicating system according to Figure 1.

The transmitter Tr comprises, in the example shown, a vacuum tube oscillator in the form of a triode $V_1$ having associated therewith a regenerative or feed-back circuit of standard construction well known in the art. The tuning condenser of the oscillating or tank circuit of the generator is shunted by an additional rotary tuning condenser $C_1$ which is driven continuously by a motor $M_o$ for modulating the transmitting frequency in the manner as shown in Figure 2. For this purpose, the condenser $C_1$, in the example illustrated, comprises a stator in the form of a first pair of spaced and fixed semi-circular plates or electrodes arranged in a single plane and constituting the armatures of the condenser connected in parallel to the oscillator tank circuit, in the manner shown in the drawing. The rotor comprises a pair of similar semi-circular electrodes insulatedly connected with each other and concentrically mounted to the outer or stationary electrodes. In an arrangement of this type, the total capacity between the stationary electrodes varies between zero (axes of both electrode pair in parallel) and a maximum (axes of both electrode pairs at right angle) according to a linear saw-tooth wave, in the manner shown in Figure 2.

The receiver Re advantageously includes a similar tuning condenser $C_2$ also driven by the motor $M_o$ in such a manner as to vary the receiver tuning adjustment in synchronism or correspondance with the variations of the transmitted frequency. In this manner, it is possible to use a sharply tuned receiver to eliminate noise and other interference as will be readily understood. It is possible, however, to omit the tuning condenser $C_2$ and to utilize a receiver of suitable band width.

The transmitted high frequency oscillations are applied to the receiver Re in part directly (oscillations $e_{1s}$) and in part indirectly by way of reflection from a distant object and with a time delay being proportionate to the object distance (oscillations $e_{2s}$). Both received signal voltages being superimposed in the receiver are rectified by means of rectifier $D_o$ of any known type, whereby to result in a low frequency voltage having a frequency corresponding to the beat frequency $F_s$ between the signals $e_{1s}$ and $e_{2s}$. This beat frequency, which according to the above varies periodically between two values proportional, respectively, to the sum and to the difference of the distance and speed of the remote object, is furthermore amplified by means of a low frequency amplifier comprising a pair of resistance coupled amplifier tubes $V_2$ and $V_3$ in the example shown in the drawing. Components of the amplified beat frequency voltage $e_s$ are applied to the delay devices $N_1$ and $N_2$. The latter, in the example shown, operate on the basis of magnetic recording and reproduction by the provision of endless magnetic recording wires or tapes $B_1$ and $B_2$ with associate recording heads or magnets $S_1$ and $S_2$, pick-up heads $A_1$ and $A_2$ and erasing or quenching heads $L_1$ and $L_2$, respectively. The recording heads $S_1$ and $S_2$ serve to record the beat voltage signal components upon the record carriers $B_1$ and $B_2$ which are moved at a constant speed by the provision of suitable driving means, such as electric motors or the like. After recording, the signals are reproduced by means of the pick-up or reproducing heads $A_1$ and $A_2$ and subsequently are removed or erased by means of the quenching heads $L_1$ and $L_2$, respectively. The reproduced signals are amplified by means of suitable amplifiers as shown at $V_4$ and $V_5$. The delay periods may be adjusted by suitably designing in the distances $d_1$ and $d_2$ between the recording and pick-up heads. For practical purposes, a single delay device such as the device $N_1$ may be sufficient, since the distance indication is dependent upon the difference between the delay periods one of which may be equal to zero. In the present case, two delay devices have been shown in order to equalize or balance the transmission conditions in both receiving channels, in particular any additional phase rotation caused as a result of the recording and reproduction operations.

The mutually delayed signals are applied to the modulator M for forming of the modulation product thereof. The modulator shown known as a ring modulator comprises four rectifiers, $D_1$, $D_2$, $D_3$ and $D_4$ connected in series with the input and output circuits connected in standard fashion as shown.

The output signal $e_m$ of the modulator M which in a known manner contains both sum and difference frequency components of the applied input signals is in turn applied to both the speed and distance indicating devices $Z_v$ and $Z_d$, respectively. Devices $Z_v$ and $Z_d$ include suitable band pass filters $BP1$ and $BP2$ for segregating the respective signal frequencies. The segregated sum and difference frequencies are applied to suitable amplitude limiters or clipper circuits in the form of rectifiers $D_5$ and $D_8$ connected in series with suitable voltage sources such as batteries $Q_1$ and $Q_2$, respectively. These limiters function in a well known manner, in that as soon as the low frequency amplitude exceeds the value of the respective battery voltage by a slight amount, current will pass through the rectifier whereby to prevent a further amplitude increase.

The amplitude limited currents are applied to suitable converting devices or frequency detectors consisting in the example shown of simple slope filters, in the form of condensers $C_5$ and $C_7$, the current through which varies in amplitude in accordance with the frequency in the manner well understood. After subsequent rectification in the rectifiers $D_6$ and $D_7$ there are obtained in this manner a pair of output currents whose amplitude varies in proportion to the speed and distance, respectively, of the remote object, in a manner explained and understood from the foregoing. These currents serve to energize the instruments $I_v$ and $I_d$ which latter may be directly calibrated in relative speed and distance units.

As will be understood, any other type of frequency detector or indicator such as a frequency analyzer comprising a plurality of mechanical or electrical resonant units may be employed for the purpose of the invention in place of the specific frequency indicator shown in the drawing. Furthermore the delay devices $N_1$ and $N_2$ may be of any other well known type, such as in the form of acoustic delay systems or electrical transmission or artificial delay lines or equivalent electrical means suitable where extremely high transmitting frequencies are used for the distance and speed indication.

While there have been shown and described a few desirable embodiments of the invention, it will be understood that modifications and variations as well as the substitution of equivalent parts and circuits for those shown herein may be made in accordance with the broader scope and spirit of the invention as defined in the appended claims. The specification and drawing are, accordingly to be regarded in an illustrative rather than a limiting sense.

I claim:

1. In a distance determining system, the combination which comprises a source of high-frequency waves, means for cyclically frequency-modulating said source with the frequency thereof increasing and decreasing alternately at substantially equal rates, a transmitter for radiating the frequency-modulated waves towards a distant object, means for receiving and heterodyning the transmitted waves after reflection from said object with wave energy supplied directly from said source, to produce beat energies having a frequency varying alternately in accordance with the sum and difference, respectively, of the distance and speed of said object with respect to said transmitter due to Doppler effect, means for deriving a pair of beat energies from said heterodyning means and for relatively time-delaying said beat energies, and intermodulating means energized by both said beat energies.

2. In a distance measuring system as claimed in claim 1, a frequency indicator connected to the output of said modulating means and responsive to the frequency component proportional to the distance of said object.

3. In a distance determining system, the combination which comprises a source of radio waves, means for cyclically frequency-modulating said source according to a triangular pattern with the frequency of said wave alternately increasing and decreasing linearly at substantially equal rates, a transmitter for radiating the modulated waves towards a distant object, means for receiving said waves after reflection by said object and heterodyning the received waves with wave energy directly derived from the transmitter, to produce beat energies having a frequency varying alternately according to the sum and difference, respectively, of the distance and speed of said object with respect to said transmitter, means for deriving a pair of beat energies from said heterodyning means and for relatively time-delaying of the derived energies, and intermodulating means energized by both said beat energies.

4. In a distance measuring system as claimed in claim 3, a frequency indicator connected to said modulating means and responsive to the frequency component proportional to the absolute distance of said object.

5. In a distance measuring system as claimed in claim 3, a pair of frequency indicating means connected to the output of said modulating means and responsive, respectively, to the frequency components proportional to the absolute distance and relative speed of said object.

6. In a radio distance determining device comprising a transmitter for emitting radio waves having a frequency increasing and decreasing alternately at substantially equal rates, means for receiving said waves after reflection by a distant object and for combining the received waves with waves directly supplied by said transmitter, to produce a beat signal, a pair of beat signal branch circuits, connected to said receiving means, means for relatively time delaying the signals through said branch circuits, and means for mutually intermodulating the output signals of said branch circuits.

7. In a radio distance determining device comprising a transmitter for emitting radio waves having a frequency increasing and decreasing periodically and linearly at equal rates according to a triangular pattern, means for receiving said waves after reflection by a distant object and for combining the received waves with wave energy directly supplied by said transmitter, to produce a beat signal, a pair of beat signal branch circuits connected to said receiving means, means for relatively time delaying the signals through said branch circuits by a period equal to one-half of the frequency variation cycles of the emitted waves, and means for mutually intermodulating the output signals of said branch circuits.

GUSTAV GUANELLA.

References Cited in the file of this patent

UNITED STATES PATENTS

| Number | Name | Date |
| --- | --- | --- |
| 2,268,587 | Guanella | Jan. 6, 1942 |
| 2,422,135 | Sanders | June 10, 1947 |
| 2,424,263 | Woodyard | July 22, 1947 |
| 2,467,455 | Aurell | Apr. 19, 1949 |
| 2,546,973 | Chatterjea et al. | Apr. 3, 1951 |
| 2,556,109 | Rust et al. | June 5, 1951 |

FOREIGN PATENTS

| Number | Country | Date |
| --- | --- | --- |
| 241,443 | Switzerland | Aug. 1, 1946 |